United States Patent [19]

Oliver et al.

[11] 4,260,139
[45] Apr. 7, 1981

[54] REFINING OF METALS

[75] Inventors: Raymond E. Oliver, Johannesburg, South Africa; John B. Payne, London, England

[73] Assignee: Matthey Rustenburg Refiners (Pty.) Limited, Johannesburg, South Africa

[21] Appl. No.: 66,283

[22] Filed: Aug. 13, 1979

Related U.S. Application Data

[60] Continuation of Ser. No. 845,390, Oct. 25, 1977, abandoned, which is a division of Ser. No. 559,424, Mar. 18, 1975, Pat. No. 4,086,084.

[30] Foreign Application Priority Data

Mar. 21, 1974 [GB] United Kingdom ............. 12597/74

[51] Int. Cl.³ ............................................. C21B 7/22
[52] U.S. Cl. .................................... 266/154; 266/195
[58] Field of Search ............... 432/134; 266/144, 154, 266/186, 176, 195

[56] References Cited

U.S. PATENT DOCUMENTS

| 2,048,668 | 7/1936 | Baensck et al. | 432/134 |
| 2,570,232 | 10/1951 | Hansgirg | 266/154 |
| 3,658,310 | 4/1972 | Spooner | 266/186 |
| 3,810,609 | 5/1974 | Von Bogdandy et al. | 266/186 |

Primary Examiner—M. J. Andrews

Attorney, Agent, or Firm—Cushman, Darby & Cushman

[57] ABSTRACT

This invention relates to refining platinum group metal concentrates and the separation therefrom of silver and of the majority of base metals with which they naturally occur. In more detail the process comprises the steps of:
(a) contacting a solid particulate mixture of base, silver and precious metal components, any of which components may be in metallic or chemically combined form, with a halogen-containing gas at a temperature which is sufficiently high for the base metal and silver components to form their halides and for the said halides substantially to volatilize from the said solid mixture, and
(b) removing the said volatilized halides from the solid precious metal-containing component which remains.

The invention also relates to an apparatus for carrying out the above process and comprises:
(a) a gas-tight means for feeding particulate solid into a tubular vessel;
(b) a vertical shaft reaction chamber connected to the tubular vessel and having an inlet for the introduction of halogen-containing gas and an outlet for exhaust gases including volatilized halides;
(c) heating means, disposed around the shaft reaction chamber, and
(d) a discharge system whereby precious metal-containing residue may be ejected from the reaction vessel.

8 Claims, 1 Drawing Figure

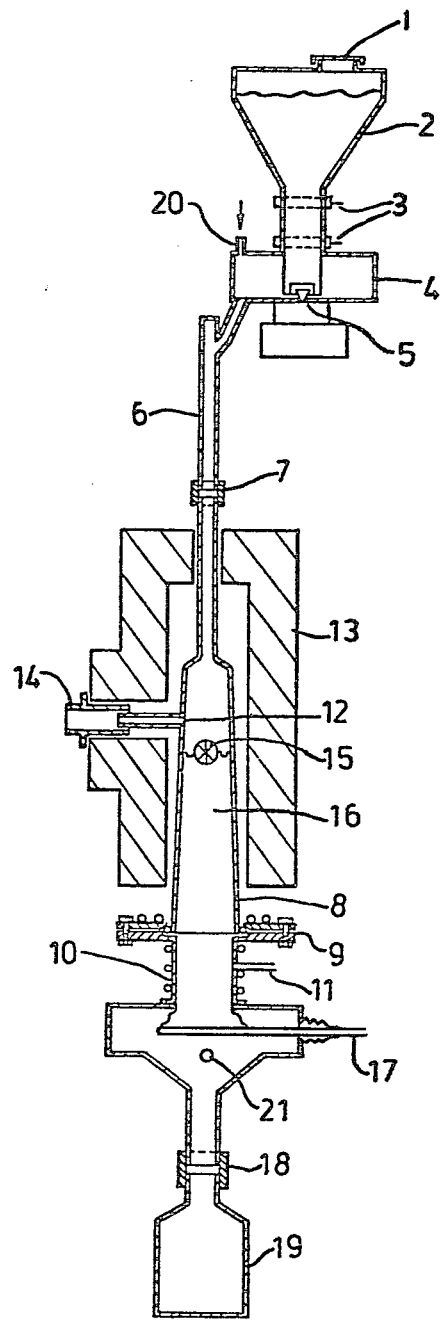

REFINING OF METALS

This is a continuation, of application Ser. No. 845,390, filed Oct. 25, 1977 now abandoned, which is a division of Ser. No. 559,424, filed Mar. 18, 1975, now U.S. Pat. No. 4,086,084.

This invention relates to the refining of metal. In particular, the invention is concerned with refining platinum group metal concentrates and the separation therefrom of silver and of the majority of the base metals with which they naturally occur.

In this specification, by "precious metal" we mean gold and any one or more of the platinum group metals (i.e. Ru, Rh, Pd, Os, Ir and Pt) and by "base metal" we mean any one or more metals other than silver, gold and the platinum group metals.

Raw material requiring refining may be a mixture containing mineral precious metal, base metal and/or silver components either in metallic form or combined in the form of chemical compounds. It is an object of the present invention to provide a simple and effective refining process whereby a substantial proportion of the said silver and the said base metal components present in the said mixture are separated from the precious metal components and the concentration of the precious metal is thereby significantly increased.

According to one aspect of the present invention a process for the separation of components of base metal and silver from components of precious metal comprises the steps of:

(a) contacting a solid particulate mixture of base, silver and precious metal components, any of which components may be in metallic or chemically combined form, with a halogen-containing gas at a temperature which is sufficiently high for the base metal and silver components to form their halides and for the said halides substantially to volatilize from the said solid mixture and (b) removing the said volatilized halides from the solid precious metal-containing component which remains.

Preferably the separation process includes a further step:

(c) in which the solid precious metal-containing component remaining after step (b) is substantially dissolved in hydrochloric acid solution containing an oxidising agent.

Suitable oxidising agents which may be dissolved in the hydrochloric acid solution of step (c) are chlorine, bromine, hypochlorite, hypobromite, sodium chlorate and sodium bromate.

The volatilized halides and unreacted halogen containing gas is preferably removed from the solid precious metal-containing residue by physical methods. The halogen containing gas to which the solid particulate mixture is exposed may also contain:

(1) an inert gas such as nitrogen or argon;
(2) a reducing gas such as hydrogen, and/or
(3) an oxidising gas, e.g. chlorine or bromine if not already present.

Preferably the halogen containing gas contains a gas selected from the group consisting of hydrogen chloride, hydrogen bromide, chlorine and bromine. Of these, we particularly prefer hydrogen chloride and chlorine, mixtures thereof and mixtures thereof with hydrogen bromide or bromine.

When ruthenium and palladium are present in the raw material to be refined we have found it preferable to use hydrogen chloride gas alone or mixed with a reducing or inert gas but not with an oxidising gas.

Preferably the solid particulate mixture is in the form of granules, pellets, powder, briquettes or tablets. Preferably, the temperature at which the gas should be brought into contact with the solid particulate mixture is within the range 900°–1300° C. Higher temperatures may be used, however, ranging up to 1700° C. A higher temperature is generated in the reactor as a result of the exothermic reaction which takes place.

The starting material on which the process of this invention may be operated may contain virtually any concentration of precious metal, but it is not normally economic to use raw material containing less than 10% by weight of precious metal. Preferably the starting material should contain at least 40% by weight of precious metal.

Typical concentrations of precious metal which might be found in raw material for processing and likely ranges of concentration are given below:

|    | Typical %w/w | Range %w/w |
|----|--------------|------------|
| Pt | 25           | 20–30      |
| Pd | 15           | 12–20      |
| Ir | 1            | 0.75–1.5   |
| Ru | 9            | 7–11       |
| Rh | 4            | 3–5        |
| Os | 0.25         | 0.1–0.7    |
| Au | 2            | 1–3        |

In the preparation of the particular solid starting material upon which the process of the invention may be performed, we prefer to mix ground up raw material with a substantially inert particulate filler such as a diatomaceous earth and a binder such as nickel chloride solution and glycerol.

One way in which the particulate solid may be prepared will now be described. A metal concentrate containing slightly less than 57% by weight of precious metal is ground up and mixed with 3% by weight of diatomaceous earth filler in this case "Celite" (Registered Trade Mark, a proprietary product sold by The Johns-Manville Corporation typically containing by weight: silica 92.7%, alumina 3.8%, ferric oxide 1.4%, lime and magnesia 1.0% and potash and soda 0.9%), and a small proportion of 30% by weight nickel chloride solution and glycerol as binder to form a stiff paste. The product is then extruded and the extrudate cut up to form pellets 5/16" diameter by ¾" long. The pellets are then heated to 500° C. in a kiln and allowed to cool.

In the process according to the present invention, when the particulate solid is exposed to a stream of halogen containing gas at elevated temperature a large proportion of the silver and all of the base metals such as Sb, Sn, Pb, Zn, Cu, Ni, Fe and As (but not all of the Se and Te) can be carried away as volatile halides. The precious metal halides are not formed as stable compounds at the temperature of operation.

A further advantage of the present invention is that treatment of the raw material concentrate with halogen containing gas at elevated temperature renders the precious metal containing residue soluble in oxidising hydrochloric acid solution. This is the preferred and additional third step (c) in the refining process according to the present invention.

Solubilization of the precious metal residue is an extremely useful feature of the present invention as it enables further separation and purification of gold and of each of the platinum group metals to be immediately carried out without intervening stages. Suitable further chemical refining, techniques which may be used are described in co-pending U.S. patent applications Ser. Nos. 529245, 531369 and 531371, now U.S. Pat. Nos. 3,960,549; 3,967,956 and 3,979,207, respectively; and German DOS Nos. 2457672, 2459099 and 2459098.

According to a further aspect of the present invention an apparatus for carrying out the process of the present invention comprises (a) a gas tight means for feeding particulate solid into a tubular vessel;
(b) a shaft reaction chamber connected to said tubular vessel and having an inlet for the introduction of halogen-containing gas and an outlet for exhaust gases including volatilized halides;
(c) heating means, such as a furnace, disposed around the shaft reaction chamber, and
(d) a discharge system whereby precious metal-containing residue may be ejected from the reaction vessel.

Conveniently, the discharged precious metal containing residue is stored in a product-storage vessel. Preferably, the tubular vessel and the shaft reaction are disposed vertically. The vertical shaft reaction chamber is made from material capable of withstanding very high temperatures of the order of 1700° C. or more. It is therefore preferably constructed of a refractory material such as fused silica, quartz, silicon nitride, carbon (in graphite form) or a similar material.

The inlet means for the introduction of halogen containing gas is preferably below the outlet means so that the reacting gases travel upwards through the vertical shaft reaction chamber containing particulate solid. The inlet means are preferably also not within the heated zone of the reaction chamber.

The heating means is preferably in the form of an electric furnace which surrounds the upper part of the reaction chamber. It is preferably also adapted to accommodate an outlet tube. The discharge system is preferably in the form of a pneumatic plough which moves backwards and forwards removing small quantities of cooled precious metal-containing residue at a time. The residue is collected in a container.

A preferred form of the apparatus according to the present invention will now be described by way of example and with reference to FIG. 1 in which it is schematically depicted.

One form of apparatus in which the process of the invention may be carried out will now be described with reference to the accompanying drawing which shows the apparatus in section.

Particulate solid is introduced through a gas tight lid, 1, into a feed hopper, 2. Rubber "iris-type" valves, 3, connect the feed hopper with a vibrofeeder, 4, having one or more "gate" valves, 5. By this means particulate solid is continuously fed into a vertical steel tube, 6, which is connected by an inflatable rubber coupling, 7, to a vertical shaft reaction chamber, 8. The reaction chamber 8 is connected by a gas-tight seal having associated cooling coils, 9, with a steel tube, 10, also having associated cooling coils and an inlet, 11, for the halogen-containing gas. The vertical shaft reaction chamber, 8, has an outlet, 12, for the reacted halogen containing gas and volatilised halides. The reaction chamber 8 is is surrounded by a furnace, 13, which as shown in the drawing also surrounds the outlet, 12, which is surrounded by an alumina side arm insert 14. In operation suction is preferably applied to outlet 12, to remove the volatilised halides.

A particular solid (i.e. pellet) level indicator, 15, consists of a radioactive source emitting through the top of the particulate solid bed, 16, and its position is detected by a Geiger-Müller tube (not shown) disposed outside the furnace on the opposite side of the reaction chamber. Product is removed at the bottom of the cooled steel tube, 10, below the reactor vessel by a pneumatic plough, 17, which moves backwards and forwards to remove, by a slicing action, small quantities of cooled precious-metal containing residue. The product passes through a vertical shaft again connected by an inflatable rubber coupling, 18, to a product hopper 19. Inlet valves 20 and 21 are for the purpose of purging the apparatus with a relatively inert gas such as nitrogen.

The vertical shaft reactor, 8, is made of a fused quartz tube approximately 4½ inches in diameter and tapering slightly from the base to the top. The overall length of the tube is about 6 feet and the reaction zone occupies about 3 feet of this distance. The reactor shaft tube, 8, is apart from a few inches at each end, surrounded by the furnace, 13. In operation, halogen-containing gas, preferably hydrogen chloride, is fed up through the tube 8, countercurrently with respect to the descending pellets, 16, which, during their passage downwards through the reaction zone are maintained at a temperature of 1000°–1100° C. for about 30 minutes.

The product removed from the product hopper at the base of the apparatus is considerably richer in precious metal when compared with the starting material. This is illustrated in the table below which shows typical mean analyses of starting material fed to the reaction vessel in the manner described above and also typical mean analyses of the product. Pellets of starting material were prepared as described above.

The "balance" of the composition of starting material consists mainly of non-metals with which some or all of the metallic components of the starting material are combined, together with one or more refractory oxides such as silica, alumina, titania, and stannic oxide. The same applies to the "balance" of the composition of the product, except that here the proportion of refractory oxides which survives exposure to the hydrogen chloride is increased.

|  | Starting Material wt% |  | Product wt% |
| --- | --- | --- | --- |
| Precious metal | 56.2 |  | 77.9 |
| Ag | 2.2 |  | 0.6 |
| Te | 2.5 |  | 3.3 |
| Sb | 1.9 | less than | 0.1 |
| Sn | 1.9 | less than | 0.1 |
| Pb | 3.5 | less than | 0.1 |
| Cu | 5.5 |  | 0.2 |
| Ni | 3.4 |  | 0.5 |
| Fe | 5.3 |  | 0.3 |
| Se | 0.5 |  | 0.7 |
| Balance (Celite, etc) | 17.1 | less than | 16.5 |
|  | 100.0 |  | 100.0 |

The product from the various "runs" from which the above mean figures are derived was fed to the first stage of a further refining process.

In one modification of the present invention, the starting material, in finely divided form, is fed into a flame of hydrogen burning in chlorine. In this process hydrogen chloride gas is produced in situ and the heat of reaction serves to raise the temperature to a suitably high value.

What we claim is:

1. An apparatus for separating base metal and silver components from a solid particulate mixture thereof with a precious metal component which comprises:
   (a) a gas-tight means including a vibrofeeder for feeding particulate solid into a tubular vessel;
   (b) a vertical shaft reaction chamber connected to the tubular vessel and having an inlet for the introduction of halogen-containing gas and an outlet for exhaust gases including volatilized halides;
   (c) heating means, disposed around the shaft reaction chamber, and
   (d) a discharge system whereby, precious metal-containing residue may be ejected from the reaction vessel.

2. Apparatus according to claim 1 in which the shaft reaction chamber is constructed from a material selected from the group consisting of silica, quartz and silicon nitride.

3. Apparatus according to claim 1 in which the inlet for the introduction of halogen containing gas is below the outlet.

4. Apparatus according to claim 1 in which the heating means is an electric furnace.

5. Apparatus according to claim 1 in which the discharge system is cooled by the use of cooling coils.

6. Apparatus according to claim 1 in which the discharge system includes a pneumatic plough.

7. Apparatus according to claim 1 wherein the tubular vessel and the shaft reaction chamber are vertically disposed.

8. Apparatus according to claim 1 comprising a feed hopper having a lower discharge end and a gas-tight lid for introducing said solid particulate mixture into the top of the hopper, a vertically disposed tubular vessel having a lower discharge end and an upper inlet end, said upper inlet end being adapted to receive particulate mixture discharged from the hopper, gas-tight discharge means including valve means and vibrofeeder means adjacent the lower end of the hopper operatively associated to continuously discharge the particulate mixture from said hopper into the top end of said tubular vessel, a vertical shaft reaction chamber connected at its top end with the lower end of the vertically disposed tubular vessel so as to receive particulate mixture therefrom, the bottom end of the reaction chamber being connected by a gas-tight seal and cooling means with a vertically positioned metallic tube member which also includes external cooling means, said metallic tube member receiving particulate mixture discharged from the bottom end of said reaction chamber and having inlet means for admitting halogen-containing gas into said tube member and consequently upwardly through said reaction chamber, outlet means in said reaction chamber for removing reacted halogen-containing gas and volatilized halides, furnace means surrounding said reaction chamber, means in said chamber for determining the solid level therein, means for removing the product from the bottom of the metal tube member, said last-named means including a pneumatic plough which moves backwards and forwards to remove by slicing action, small quantities of cooled precious-metal containing residues, and collecting means below said plough for collecting the product.

* * * * *